(12) United States Patent
Park (10) Patent No.: US 12,318,982 B2
(45) Date of Patent: Jun. 3, 2025

(54) PLASTIC TUBE SCREEN FILL INJECTION MOLD

(71) Applicant: Chong Mook Park, Falls Church, VA (US)

(72) Inventor: Chong Mook Park, Falls Church, VA (US)

(73) Assignee: Chong Mook Park

( * ) Notice: Subject to any disclaimer, the term of this patent is extended or adjusted under 35 U.S.C. 154(b) by 529 days.

(21) Appl. No.: 17/401,195

(22) Filed: Aug. 12, 2021

(65) Prior Publication Data
US 2023/0050033 A1    Feb. 16, 2023

(51) Int. Cl.
| | |
|---|---|
| B29C 45/27 | (2006.01) |
| B29C 45/26 | (2006.01) |
| B29C 45/72 | (2006.01) |
| B29C 45/76 | (2006.01) |
| B29L 23/00 | (2006.01) |

(52) U.S. Cl.
CPC ............ B29C 45/261 (2013.01); B29C 45/27 (2013.01); B29C 45/7207 (2013.01); B29C 45/7626 (2013.01); B29C 2945/76722 (2013.01); B29C 2945/76896 (2013.01); B29L 2023/00 (2013.01)

(58) Field of Classification Search
CPC .................................................. B29C 45/261
See application file for complete search history.

(56) References Cited

U.S. PATENT DOCUMENTS 3,066,353 A * 12/1962 Marks .................... B29C 45/261
425/86
3,805,875 A * 4/1974 Daightery ............... B29C 45/03
164/159

FOREIGN PATENT DOCUMENTS

| CN | 112109283 A | * | 12/2020 | ............. B29C 45/26 |
|---|---|---|---|---|
| CN | 112519129 A | * | 3/2021 | ............. B29C 35/18 |
| CN | 112536985 A | * | 3/2021 | ............. B29C 45/14 |
| CN | 113085105 A | * | 7/2021 | ............. B29C 45/26 |

OTHER PUBLICATIONS

Gong CN112109283A 2020 English Translation (Year: 2020).*
Zeng CN113085105A 2021 English Translation (Year: 2021).*
Huang CN112536985A 2021 English Translation (Year: 2021).*
Chen CN112519129A 2021 English Translation (Year: 2021).*

* cited by examiner

*Primary Examiner* — Jacob T Minskey
*Assistant Examiner* — Adrien J Bernard
(74) *Attorney, Agent, or Firm* — Chong Mook Park (57) ABSTRACT

The present invention involves a fabrication of plastic-tube-screen-fill (PTSF) injection mold fabricating PTSFs using molten plastics injection molding machine. The PTSFs replace PVC-film-fills currently using in water evaporative cooling towers. The PTSFs have a higher water cooling efficiency compared to the efficiency of the PVC-film-fills and therefore the PTSFs reduce the operation and construction expenses of the cooling tower, and also the PTSFs reduce the production of plastic wastes due to the utilizing of high cooling efficient media in the cooling towers. In order to commercialize the PTSFs, a manufacturing tool of the PTSFs to fabricate a low-cost plastic-tube-screen-fill is needed. To achieve this end, the PTSF injection mold is invented by comprising four partial-molds, which is operated in three dimensional disassembling and reassembling processes using a vertical injection molding machine.

9 Claims, 6 Drawing Sheets

PLASTIC TUBE SCREEN FILL INJECTION MOLD

CROSS REFERENCE TO RELATED APPLICATION

Reference Cited

U.S. Patent Documents
U.S. Pat. No. 10,046,502 B2, Aug. 14, 2018, Chong Mook Park

BACKGROUND OF THE INVENTION

Field of the Invention

This invention relates to an injection mold for fabricating of using an injection molding machine. More specifically, the injection mold of the present invention for fabricating of the plastic-tube-screen-fill is concerned with articulated molds comprising multiple piece partial-molds that cooperate together to define a complete mold, and then disassemble to release the finished molding.

Description of the Related Art

Figure 2:
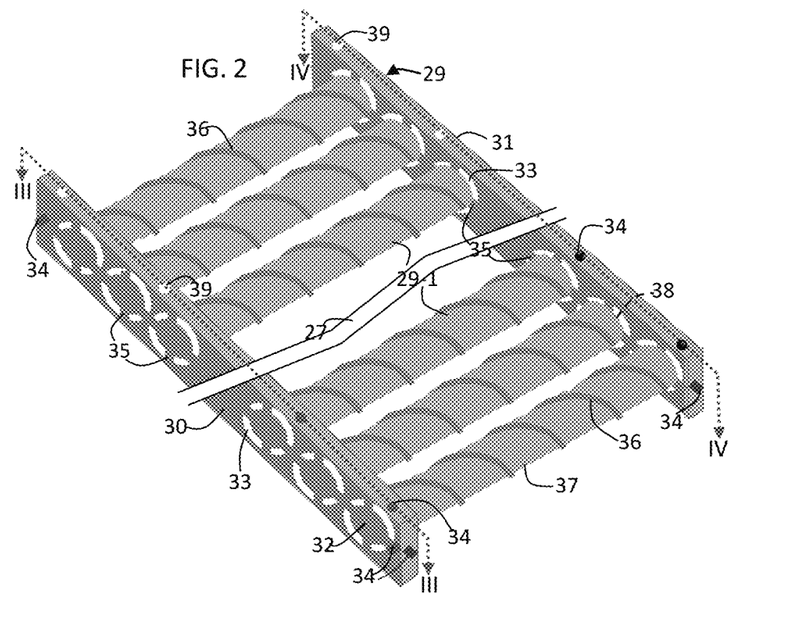
FIG. 2 schematically illustrates the PTSF fabricated by using the PTSF injection mold, wherein only both-sides are shown by reducing of the middle portion of the PTSF to show a total structural configuration of a single structured PTSF.

The plastic-tube-screen-fill (PTSF) is schematically drawn in FIG. 2 and patented, U.S. Pat. No. 10,046,502 B2, by the present inventor. The PTSF has the same function and process of evaporative water cooling with those of a current PVC film fill in the shape of thin plate. The PVC film fills are used for fabrication of PVC film fill packs, used in current water cooling towers, which are made up of by assembling side by side of a plurality of PVC film fills. But, the PVC film fills have drawbacks such as a lower efficiency of water cooling and more consumption of materials for their fabrication, compared with those of the PTSF. The PVC film fill is fabricated using a common double pieces molding process which employs two partial-molds, one for each side of the film fill plate. On the other hand, the previous fabrication method of PTSF presented by the present inventor is to fabricate the PTSF through multiple fabrication steps, namely, 6 steps including three fabrication steps including one tube fabrication step and two PTSF frame fabrication steps, and three assembling steps of those three components of tube and two frames. The detailed fabrication process of the PTSF is referred to the patent given above. The multiple-pieces PTSF to be fabricated through the multiple fabrication steps definitely induces causes of cost-ineffectiveness and low competitiveness of the PTSF. Consequently, the fabrication method of the PTSF provided in the patent given above has a serious drawback of the multi-step fabrication method which cannot strengthen the market competitiveness of the PTSF. Therefore, a new fabrication method of the PTSF able to be making the fabrication cost of the PTSF to be extremely low is demanded and presented in the present invention.

SUMMARY OF THE INVENTION

Figure 1:
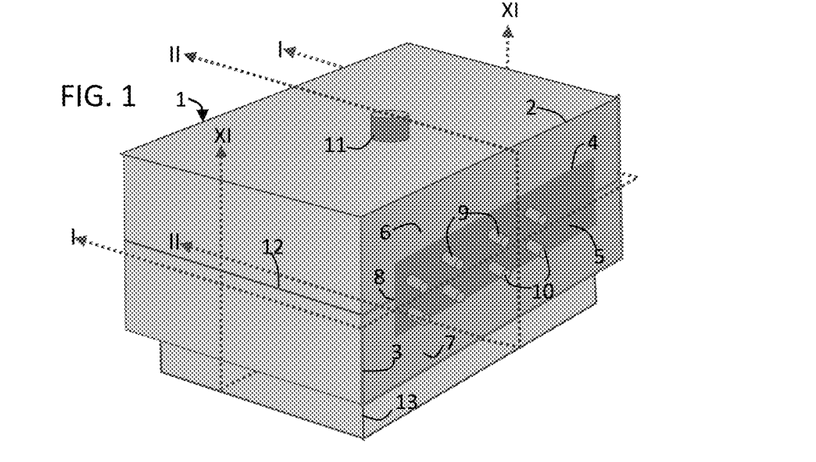
FIG. 1 is a schematic picture of PTSF injection mold.

The PTSF injection mold of the present invention fabricates the plastic-tube-screen-fill, invented by the present inventor, by a single shot of the molten plastics into the PTSF injection mold using the molten plastics injection machine. The PTSF injection mold is shown in FIG. 1, which comprises upper and lower partial-molds, a cavity partial-mold placed between the upper and lower partial-molds, and an ejector system assembly attached beneath the lower partial-mold. The cavity partial-mold comprises a top frame partial-mold and metal-rod-filled-tubes (this type tubes are explained in the section of <Cooling Process of Molded PTSF>) bottom frame partial-mold. The top frame partial-mold comprises a plurality of partial circular plates surrounding circles provided on an inner surface along the axis of the frame as shown in FIGS. 5-2, 5-4 and 5-5. The metal-rod-filled-tubes attached bottom frame partial-mold is made up of a plurality of metal-rod-filled-tubes whose larger ends are attached over every circles provided on the inner surface along the axis of the same structured frame with the top frame of the top frame partial-mold as illustrated in FIGS. 5-1, 5-3 and 5-6. Thus, the cavity partial-mold is in two components of the top frame partial-mold and the metal-rod-filled-tubes attached bottom frame partial-mold and therefore the PTSF injection mold comprises four partial-molds, which allows the PTSF injection mold to be used in a vertical injection molding machine for disassembling of the PTSF injection mold to eject the product PTSF. The PTSF comprises three components of plastic-tube-screen, top frame, and bottom frame, which are in one structure and in the shape of a rectangular plastic tube screen attached between top and bottom frames as shown in FIG. 2. The PTSF has an unique design of the end-side-lengths of the top and bottom frames of the PTSF as the tube being near the left edge of the frame is apart from the edge of the frame by ¾ tube-regular-spacing (long end-side-length, tube-regular-spacing is an interval of axis between the adjacent tubes placed on along the axis of the frame), while the tube near the right edge is apart by ¼ tube-regular-spacing (short end-side-length) and the tubes in the middle of the PTSF are apart from each other at the tube-regular-spacing as shown in FIG. 2. Such arrangement of the tubes in the PTSF pack is described in the third paragraph of <Upper and Lower Partial-Molds>.

Figures 51, 52, 53, 54:
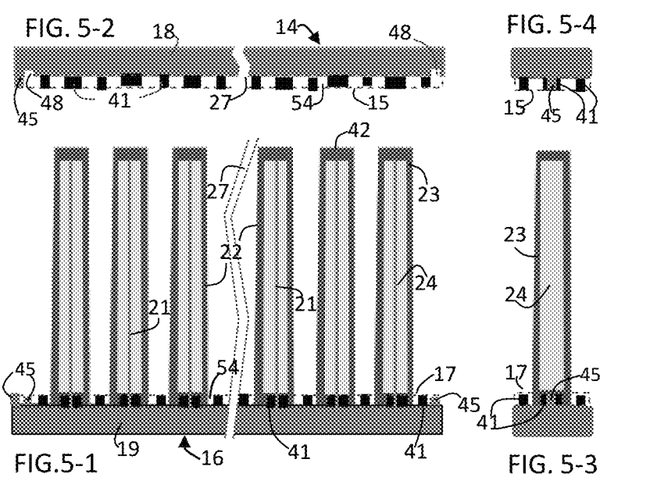
Figure 55:
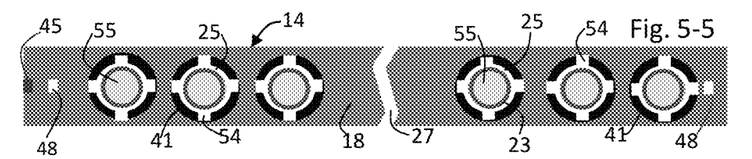
Figure 56:
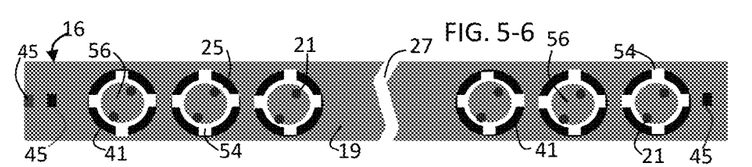

Since the PTSF is in a single structure and has partial circular holes on the top and bottom frames and the tubes of the PTSF are not solid tubes as shown in FIG. 2, the PTSF cannot be fabricated using a double piece injection mold. So, the single structure of PTSF is necessary to be changed into two pieces which are horizontally separable from each other. To achieve this end, the plastic tubes of the PTSF are replaced with metal tubes whose internal spaces are filled with metal rods, namely, metal-rod-filled-tubes, because plastics and air pocket are not allowable in the mold. The PTSF used for fabrication of the injection mold is replaced with Metal-Rod-filled-tube-Screen-Fill (MRSF) and then the one structured PTSF can be divided into two structured components of the top frame and the Metal-Rod-filled-tube-Screen (MRS) attached bottom frame (MRS bottom frame) made up by attaching MRS on the bottom frame to be in one single structure as shown in FIGS. 5-1 and 5-3. Hence, the one structured PTSF comprises the top frame and MRS bottom frame partial-molds so that the PTSF injection mold comprises four components of the upper and lower partial-molds, and the top frame and MRS bottom frame partial-molds. The metal tubes used for fabrication of the injection mold are slightly in cone shapes and their large-side outer diameters are same with inner diameters of the plastic tubes of the PTSF. The cone-shaped tubes help for the MRS to be easily pulled out from the molded PTSF by a mechanical machine after molding of the PTSF formed surrounding the MRSF within the PTSF injection mold.

The formation of the PTSF cavity within the PTSF injection mold is accomplished by covering the cavity partial-mold with the inner surfaces of the upper and lower partial-molds to define a pair of complete PTSF cavity (including tube screen cavities, top and bottom frame cavities) formed surrounding the MRSF within the cavity partial-mold when the upper and lower partial-molds are brought together over the cavity partial-mold. Now, the single structured PTSF is fabricated by a single shot of molten plastics into the PTSF cavity formed surrounding the entire surface of the MRSF within the cavity partial-mold of the PTSF injection mold by using the injection molding machine and then the PTSF injection mold is disassembled to release the finished molding of PTSF as shown in FIG. 2 after cooling and setting of the formed PTSF surrounding the surface of the MRSF within the cavity partial mold. The PTSF injection mold, placing upright on its bottom side with the lower and upper partial-molds at the left and right side of the cavity partial-mold as shown in FIG. 1-2, is disassembled into three parts, lower partial-mold, cavity partial-mold, and upper partial-mold placed as shown in FIGS. 3-3, 3-1, and 3-2, respectively. FIGS. 3-2 and 3-3 show the same inner surfaces of the upper and lower partial-molds, comprising imaginary top and bottom frames including a plenty of male and female push-button producers near the end sides of the both imaginary frames and a plurality of hollowed-out tube cavity halves of the PTSF cavity between the imaginary top and bottom frames, which are showing the components provided on the inner surfaces of the upper and lower partial molds are in the same layout of positions and configurations to each other. FIG. 3-1 shows a schematic drawing of the cavity partial mold comprising the top frame partial-mold and the metal-rod-filled-tubes attached bottom frame partial-mold of which top and bottom frames comprise multiple female and male push-buttons. The top frame comprises the female push-button producer on the left end-surface of the frame and the male push-button producers on both end-side top surface of the frame. The bottom frame comprises the female push-button producer on the left end-surface of the frame and the female push-button producers on both end-side bottom surface of the frame, and multiple gas venting channels made on the upper surfaces of top and bottom frame base plates of the cavity partial mold by connecting one end of the gas venting lines to the top and bottom frame producers.

Figure 61:
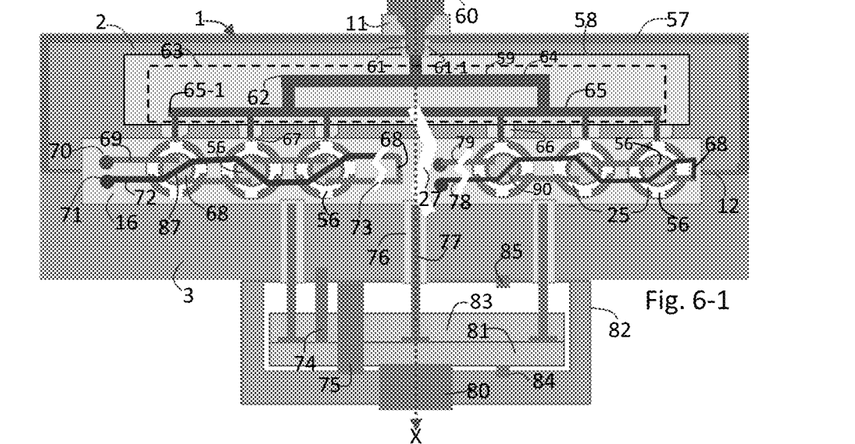
Figure 62:
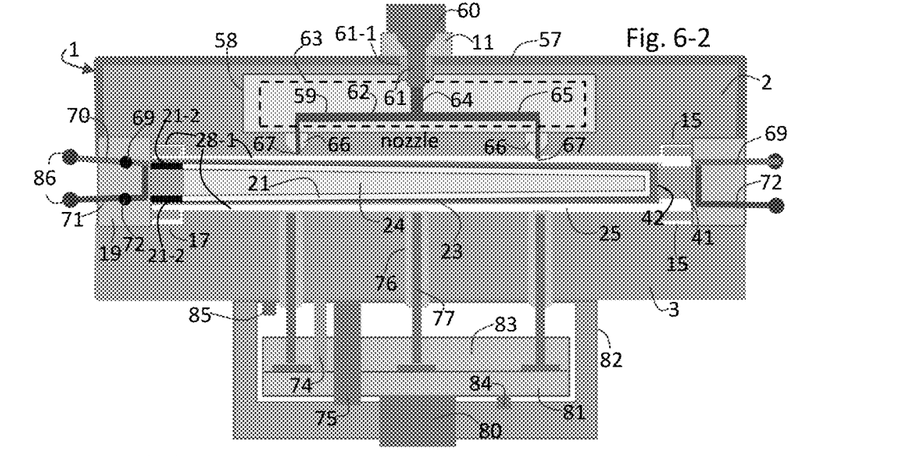

In order to supply the molten plastics into the PTSF cavity of the PTSF injection mold, a runner system comprising a sprue, main runners, bridge runners, and gates is set up within the upper partial-mold as shown in FIGS. 6-1 and 6-2. The molten plastics is transported from the injection machine nozzle to the runner system through the sprue and then flows through the main and bridge runners to reach the gates as shown in FIG. 6-1. FIG. 6-2 illustrates the cross section view X-X of the PTSF injection mold shown in FIG. 1, showing a side view of the runner system of main and bridge runners reaching to the gates. Passing the gates, the molten plastic fills the entire PTSF cavity. As a total length of the runners from the sprue to the gates is relatively long, it is necessary to keep the molten plastics in a required molten state while flowing through the long runner. The runner system is, therefore, heated through the heated manifold provided surrounding the runner system and an insulator is covered over the outside surface of the upper partial-mold to prevent heat loss through the surface of the injection mold as shown in FIGS. 6-1 and 6-2.

Figures 41, 45, 46:
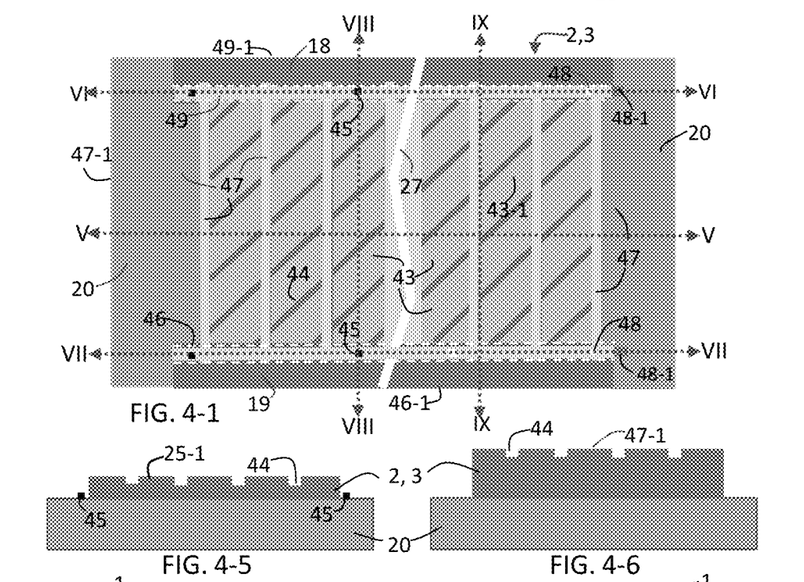
Figure 42:
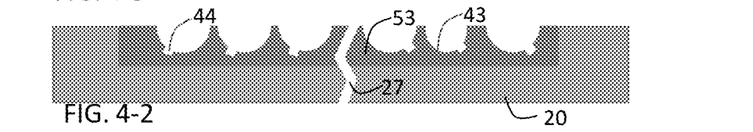
Figure 43:
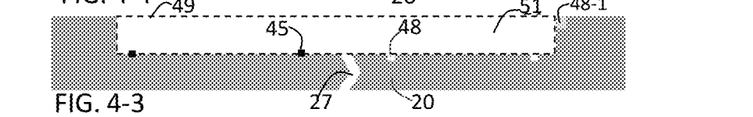
Figure 44:
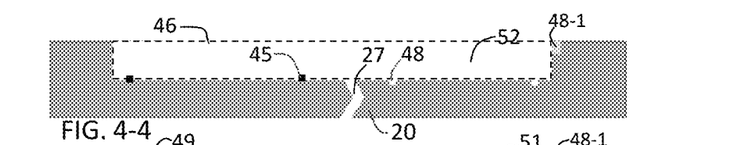
Figure 47:
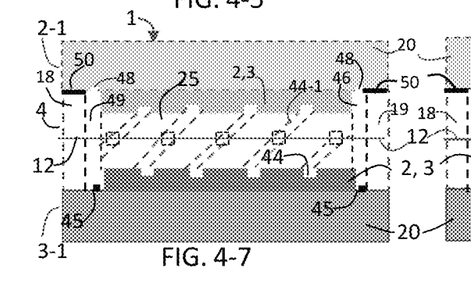
Figure 48:
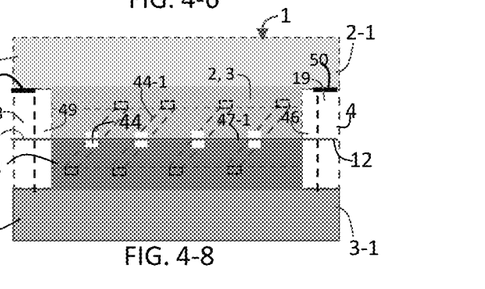

The assembling of the upper and lower partial-molds and the cavity partial-mold builds the PTSF injection mold forming the PTSF cavity in the core of the PTSF injection mold. The PTSF cavity is full of air or gas. Hence, when the molten plastics is injected into the PTSF cavity to fabricate the PTSF, the gas is vented out of the cavity at the same time. If the gas is slowly or not vented out, the molten plastics is slowly or cannot be fully entered the cavities because the gas pushes back the molten plastics. Consequently, the gas venting lines are necessary for the gas in the cavities to be smoothly vented out of the PTSF injection mold. So, multiple gas venting lines are made on both upper side base plates of the cavity partial-mold, jointing area between the upper surfaces of top and bottom frame base plates of the cavity partial-mold and the surfaces of top and bottom frame-side base plates of the upper partial-mold as shown in FIGS. 4-1 and 4-3.

Figure 7:
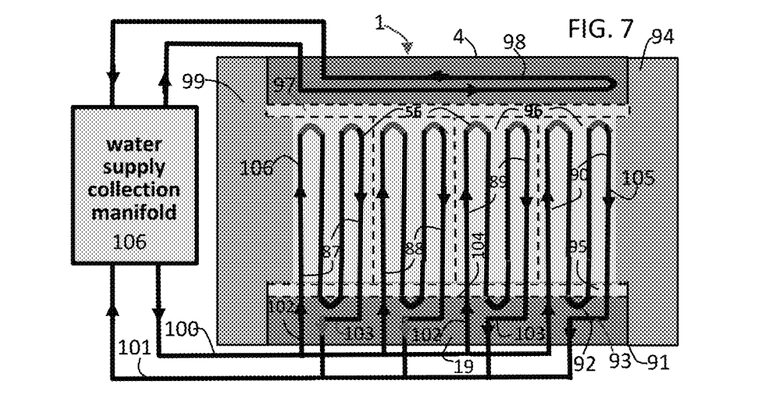
FIG. 7 shows a schematic picture of a cooling system of the PTSF injection mold.

For quickly cooling and setting of the molten plastics of the molded PTSF in the core of the PTSF injection mold, the water is supplied adjacent to the tubes, top frame, and bottom frame of the molded PTSF. To cool the molded tubes, the U-shape cooling loops are built inside the metal-rod-filled-tubes of the MRSF within the cavity partial-mold as shown in FIGS. 6-1, 8-1 and 8-2. To cool the molded bottom frame, the inlet and outlet cooling loops connected to each of the U-shape cooling loops within the metal-rod-filled-tubes of the MRSF are placed adjacently along the outside surface of the bottom frame of the cavity partial-mold and built in the base plate of the bottom frame as shown in FIGS. 6-2 and 7. Also, as shown in FIG. 7, to cool the molded top frame of the PTSF cavity partial-mold, a single U-shape cooling loop is built in the base plate and adjacent along to the outside surface of the top frame and the inlet and outlet ports of the all cooling loops are connected to the water supply and collection manifold. A cooling process of the molded PTSF allows the molded PTSF to harden and become dimensionally stable for ejection of the product, PTSF, and is uniformly and entirely progressed over the whole body of the molded PTSF. For such a cooling process of the molded PTSF to successfully progress, the heat transferred into the molded PTSF from the molten plastics is carried away by a coolant which circulates through the cooling loops provided adjacently to the inner surfaces of the plastic tubes of the PTSF formed within the cavity partial-mold as shown in FIG. 6-2, 8-1 and 8-2. Since the temperature and flowing rate of the coolant determine the efficiency of the heat removal from the molded PTSF and also the temperature difference of the inlet and outlet coolants is kept under a temperature required in the molten plastics injection molding machine, the long cooling loop of the present cooling system is grouped into four small-groups of cooling loops as shown in FIG. 7 in order to accurately control the temperature and flow rate of the coolant.

For ejecting of the molded PTSF, the disassembling of the tour partial-molds comprised in the PTSF injection mold needs twice of disassembling processes such as horizontally removing process of the cavity partial-mold and vertically lifting-up process of the upper partial-mold. To satisfactorily accomplish such processes, a vertical injection molding machine performing such a three dimensional disassembling and assembling process of the PTSF injection mold is employed for fabricating of the PTSF. Another reason to employ the vertical injection molding machine is based on the following reason. The PTSF cavity formed surrounding the MRSF within the cavity partial-mold is in the shape of the wide and flat plate so that the PTSF cavity is necessary to be placed on a horizontal flat place, considering a gravitational force evenly affecting the movement of the molten plastics throughout the entire PTSF cavity (tube cavities, top and bottom frame cavities) placed on the horizontal flat place. Thus, taking account of three dimensional loading and unloading processes and the wide and flat plate-shape of the PTSF cavity, a vertical injection molding machine is a right machine for fabrication of the PTSF. The PTSF injection mold is mounted on the workbench of the vertical injection molding machine and the molten plastics is injected and cooled in the mold. When the molded PTSF is ready for ejection, the ejection process starts by removing the cavity partial-mold from the PTSF injection mold by simultaneously pulling out the top frame and MRS bottom frame partial-molds in the opposite directions against each other, and then, the metal-rod-filled-tubes are pulled out from the molded plastic tubes along with pulling-out of the MRS bottom frame partial-mold at the same time. Consequently, the molded PTSF remains alone within the PTSF injection mold without the cavity partial-mold. Next, the upper partial-mold is removed to leave the molded PTSF on the lower partial-mold. Finally, the ejector pins of the ejector system assembly shown in FIG. 1 are moved upward to push the molded PTSF off from the lower partial-mold.

BRIEF DESCRIPTION OF THE FIGURES

FIG. 1-1 shows a cross section I-I of the PTSF injection mold shown in FIG. 1, which is a reduced schematic picture of the cavity partial-mold molding the PTSF in the core of the PTSF injection mold. FIG. 1-2 is a cross section view II-II of the PTSF injection mold shown in FIG. 1, which shows a PTSF cavity, including tube cavity, top and bottom frame cavities, formed surrounding a MRSF cavity within the cavity partial-mold whose both sides are covered with each of upper and lower partial-molds, and FIG. 1-3 shows a cross section taken along a line of XI-XI shown in FIG. 1.

FIGS. 2-1 and 2-2 are schematic pictures illustrating the respective cross sections III-III of the bottom frame and IV-IV of the top frame of the PTSF shown in FIG. 2.

FIG. 3-1 shows schematic pictures of cavity partial-mold comprising top frame and MRS bottom frame partial molds with female push-button producers on left end-surfaces of the top and bottom frames, and multiple gas venting channels made on the upper surfaces of top and bottom frame base plates of the cavity partial mold by connecting one end of the gas venting lines to the top and bottom frame producers. FIGS. 3-2 and 3-3 show respectively the schematic pictures of their inner surfaces facing up of the upper and lower partial-molds, including hollowed-out male push-button producer halves made on right end-surfaces of the top and bottom frames.

FIG. 4-1 shows the schematic picture of the same inner surfaces of the upper and lower partial-molds comprising a plurality of hollowed-out tube cavity halves, multiple male and female push-button producers made on the top and bottom frames near edges of the frames, respectively, and hollowed-out male push-button producer halves made on the right end-surfaces of the top and bottom frames. FIG. 4-2 illustrates a schematic drawing of a cross section view V-V of upper and lower partial-molds hollowed-out of MRSF cavity half shown in FIG. 4-1. FIGS. 4-3 and 4-4 show the respective cross section views of VI-VI and VII-VII on the imaginary top and bottom frames shown in FIG. 4-1. FIGS. 4-5 and 4-6 are schematic pictures of cross sections taken along lines of VIII-VIII and IX-IX shown in FIG. 4-1. FIGS. 4-7 and 4-8 are imaginary schematic cross section views of the PTSF injection mold respectively taken along lines of VIII-VIII and IX-IX shown in FIG. 4-1.

FIGS. 5-1 to 5-6 illustrate explicit schematic drawings related to the top frame partial-mold and MRS bottom frame partial-mold necessary for setting the cavity partial-mold. FIGS. 5-1 and 5-3 are the front and side views of the MRS bottom frame partial-mold, respectively, and also FIGS. 5-2 and 5-4 are those of the top frame partial-mold. FIG. 5-5 shows a top view of the top frame partial-mold with its inner surface facing up and FIG. 5-6 shows a top view of the MRS bottom frame partial-mold with the MRSF standing upright on its bottom frame.

FIG. 6-1 illustrates a schematic drawing of the front view of the PTSF injection mold including runners and cooling systems within PTSF injection mold with an ejector system assembly attached beneath the lower partial-mold. FIG. 6-2 is a schematic picture of a cross section taken along line X-X of PTSF injection mold shown in FIG. 6-1.

FIG. 8-1 shows schematic drawings of an axial cross section view of a metal tube filled with metal rod hollowed-out of U-shape cooling loop embedded over the rod surface along the axis of rod and a larger end-surface view of the metal tube and the picture shown in FIG. 8-2 shows the cross section and larger end-surface views taken after rotating the metal tube by 90 degree along the axis of the metal tube.

DESCRIPTION OF NUMBER IN THE DRAWINGS

1 PTSF injection mold, 2 upper partial-mold, 2-1 imaginary upper partial-mold, 3 lower partial-mold, 3-1 imaginary lower partial-mold, 4 cavity partial-mold, 5 bottom frame side of cavity partial-mold, 6 bottom frame side of upper partial-mold, 7 bottom frame side of lower partial-mold, 8 bottom side of PTSF injection mold, 9 cold water inlet port, 10 warm water inlet port, 11 nozzle supporter, 12 mold parting line, 13 ejector system assembly, 14 top frame partial-mold, 15 top frame cavity (top frame imaginary line, imaginary top frame), 16 MRS bottom frame partial-mold, 16-1 MRS bottom frame, 17 bottom frame cavity (bottom frame imaginary line, imaginary bottom frame), 17-1 MRS bottom frame cavity, 18 top frame base plate, 19 bottom frame base plate, 20 mold base plate, 21 U-shape cooling loop, 21-1 U-shape hollowed-out line, 21-2 inlet port of U-shape cooling loop, 21-3 outlet port of U-shape cooling loop, 22 metal-rod-screen (metal-rod-filled-tube-screen, MRS), 22-1 U-shape-cooling-loop embedded metal-rod-filled-tubes (UMRS, U-shape-cooling-loop embedded Metal-Rod-filled-tubes Screen), 23 cone-shape metal tube (cone-shape metal-rod-filled-tube, metal-rod-filled-tube, metal-rod-filled-metal-tube, metal tube), 24 U-shape cooling loop embedded metal rod (metal solid rod), 25 tube cavity (tube producer, molded tube), 25-1 lowest tube cavity surface, 26 imaginary top and bottom frames of cavity partial-mold, 27 figure reduction gap, 28 imaginary contact surface between upper and lower partial-mold, 28-1 PTSF cavity (cavity), 29 PTSF (plastic-tube-screen-fill, MRSF), 29-1 plastic-tube-screen (plastic tube), 30 top frame (top frame body), 31 bottom frame (bottom frame body), 32 plugged tube end (gray circle), 33 partial circular hole, 34 male push-button, 35 tube holder, 36 corrugate line, 37 corrugate tube (tube), 38 open tube end (not shown in FIG. 2), 39 female push-button, 40 I-I cross section view in FIG. 1, 41 partial circular dark plate hole producer (partial circular plates, dark parts), 42 plugged end of metal tube (end-surface), 43 hollowed-out PTSF cavity half, 43-1 long rectangular gray-part (hollowed-out tube cavity half), 44 carved corrugated spiral line (slanted line), 44-1 imaginary carved corrugated spiral line, 45 female push-button producer (black spot), 46 imaginary bottom frame half (long narrow square dot line), 46-1 bottom frame side, 47 uncarved inner surface, 47-1 inner surface of the upper and lower partial mold, 48 male push-button producer (white spot), 48-1 hollowed-out male push-button producer half 49 imaginary top frame half (long narrow square dot line), 49-1 top frame side, 50 gas venting line (gas venting channel), 51 top frame white square box (top frame half producer space to be occupied with top frame cavity half of the PTSF cavity), 52 bottom frame white square box (bottom frame half producer space o be occupied with bottom frame cavity half of the PTSF cavity), 53 upper and lower mold halves hollowed-out of tube cavity halves of PTSF cavity halves, 54 tube holder cavity, 55 plugged tube-end producer (gray circle), 56 water entering end of U-shaped cooling loop embedded metal-rod-filled-tube (dark circle), 57 heat insulator, 58 hot runner system, 59 bridge runner system, 60 injection machine nozzle, 61 sprue, 61-1 sprue bushing, 62 molten plastic passage (runners), 63 heated manifold, 64 main hot runner, 65 bridge hot runner, 65-1 cold-slug-well, 66 nozzle, 67 direct gate (gate), 68 end loop of each group cooling loop, 69 inlet port of $1^{st}$ group cooling loop, 70 cold water inlet coolant loop, 71 warm water outlet coolant loop, 72 outlet port of $1^{st}$ group cooling loop, 73 coolant loop reduction gap, 74 return spring, 75 ejector guide pin, 76 ejector pin bushing, 77 ejector associate pin (ejector pin gap), 78 outlet and 79 inlet ports of $4^{th}$ group cooling loop, 80 ejector bar, 81 ejector back plate, 82 ejector system assembly, 83 ejector pin plate, 84 back plate stopper, 85 ejector stopper, 86 inlet/outlet outside coolant loop connected to coolant supply/collection manifold, 87 $1^{st}$ group cooling loop, 88 $2^{nd}$ group cooling loop, 89 $3^{rd}$ group cooling loop, 90 $4^{th}$ group cooling loop, 91 bottom side of PTSF injection mold, 92 inlet coolant loop, 93 zigzag outlet coolant loop, 94 right side of PTSF injection mold, 95 imaginary bottom frame of cavity partial-mold, 96 imaginary MRSF including 4 groups of metal-rod-filled tubes, 97 imaginary top frame of cavity partial-mold, 98 $5^{th}$ group cooling loop, 99 left side of PTSF injection mold, 100 inlet outside coolant loop, 101 zigzag-returning outlet outside coolant loop, 102 inlet port of cold water (inlet port), 103 outlet port of warm water (outlet port), 104 bottom frame outside surface, 105 cooling system, 106 coolant supply and collection manifold.

DESCRIPTION OF SPECIFIC TERMS USED

Plastic-tube-screen-fill (PTSF) 29: a plurality of tubes are vertically arranged in the shape of a rectangular string screen between the top and bottom ring-shaped holes perforated frames by attaching their both ends on the inner circles of the ring-shaped holes provided on the inner surfaces along the axes of the frames at a tube-regular-spacing between the adjacent tubes on the frames.

Cavity partial-mold 4: cavity partial-mold allows for PTSF cavity to be formed surrounding the cavity partial-mold by covering the upper and lower cavity partial-mold halves with the hollowed-out PTSF cavity halves on the inner surfaces of the upper and lower partial molds.

Tube cavity 25: tube-shape space formed surrounding the metal-rod-filled-tube surface by covering the upper and lower metal-rod-filled-tube halves with hollowed-out tube cavity halves on the inner surfaces of the upper and lower partial-molds.

Metal-rod-filled-tube 23: tube is filled with metal rod.

PTSF cavity 28-1: PTSF-shape space formed surrounding the MRSF within the cavity partial-mold.

MRS bottom frame 16-1: Metal-Rod-filled-tube-Screen (MRS) attached bottom frame made up by attaching MRS on the bottom frame to be in one single structure as shown in FIG. 5-1

Figure 11:
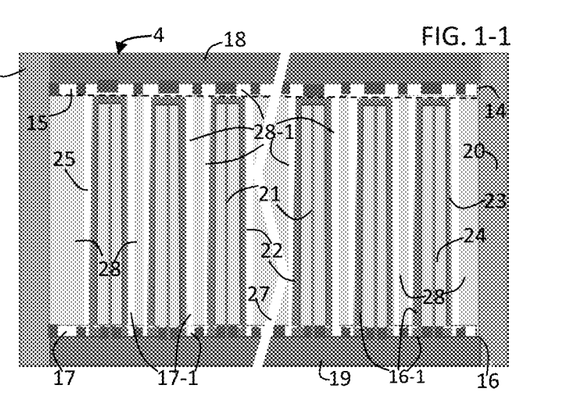
Figure 12:
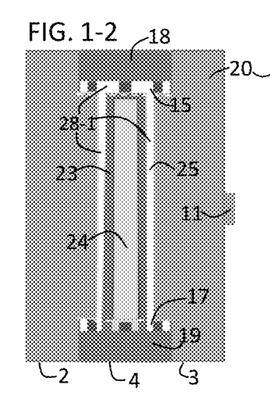
Figure 13:
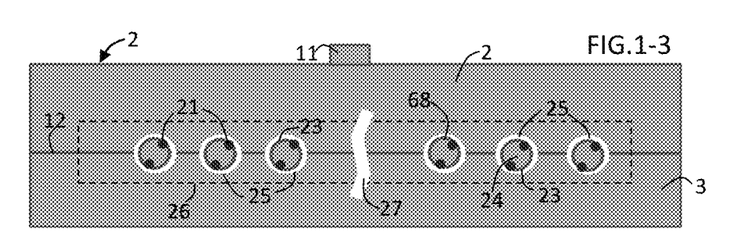
Figure 21:
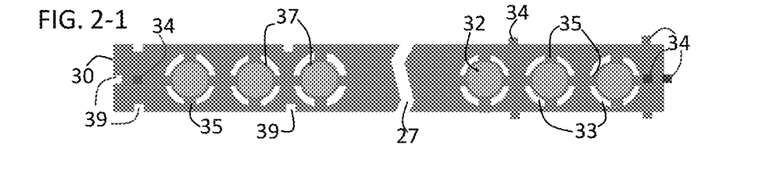
Figure 22:
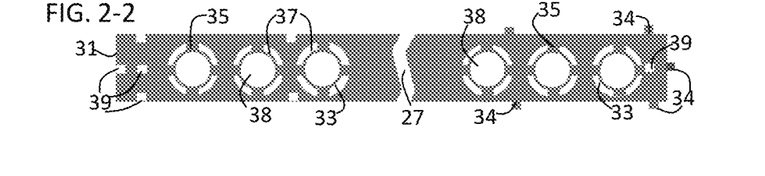

MRS bottom frame cavity 17-1: partial PTSF cavity without top frame cavity comprising cavity surrounding the MRS and bottom frame cavity shown in FIG. 1-1.

MRSF 29: Metal-Rod-filled-tube-Screen-Fill comprising top and bottom frames and metal-rod-tube-screen between them.

Hollowed-out tube cavity halves 43-1: tube cavity halves are hollowed-out on the inner surfaces of the molds, which are provided between the imaginary top and bottom frames.

Hollowed-out PTSF cavity half 43: plastic-tube-screen-fill cavity half is hollowed out on the inner surface of the mold.

Hollowed-out inner surfaces: Inner surface hollowed-out of the PTSF cavity halves on upper and lower partial-molds.

Upper and lower mold halves hollowed-out of tube cavity halves of PTSF cavity halves 53: upper and lower mold halves on which tube cavity halves of PTSF cavity halves are hollowed-out on upper and lower mold halves.

Female and male push-button producers 45, 48: female and male push-button producers make their counterpart male and female push-buttons on the top and bottom frame of PTSF, respectively.

Imaginary top and bottom frame 26: long rectangular shape dot line marked adjacent to the tube-screen cavity half hollowed-out on the inner surface of the upper or lower partial-mold.

Tube-regular-spacing: an interval between the longitudinal axes of the adjacent tubes along the axes of the top and bottom frames.

Metal-rod-filled-tube 23: tube is filled with metal rod.

Metal-rod-filled-tube-screen (MRS) 22: a rectangular shape screen is made up of metal-rod-filled-tubes.

Metal-rod-filled-tubes attached bottom frame partial-mold: bottom frame partial-mold with metal-rod-filled-tubes attached on the inner surface of the bottom frame of the bottom frame partial mold.

Top and bottom frame base plates 18, 19: base molds supporting top and bottom frame producers of the top and bottom frame partial-molds.

U-shape cooling loop embedded metal-rod-filled-metal-tube 22-1: metal-tube filled with metal-rod having U-shape cooling loop embedded over both side rod-surfaces along the axes of the metal rod.

DETAILED DESCRIPTION OF THE PREFERRED EMBODIMENT

PTSF Injection Mold

The PTSF injection mold 1 of the present invention for fabricating of the PTSF 29 using to an evaporative cooling tower comprises the upper 2 and lower partial-molds 3 whose inner surfaces are contacted to each other at the mold parting line 12 located between the upper 2 and lower partial-molds 3 and the cavity partial-mold 4 placed between the upper 2 and lower partial-molds 3 as shown in FIG. 1. The upper 2 and lower partial-molds 3 comprise their inner surfaces hollowed-out of the PTSF cavity halves 43 of the tube-screen-fill cavity 28-1 and the male 48 and female push-button producers 45 provided on the imaginary top 49 and bottom frame 46 of the hollowed-out PTSF cavity half 43. The cavity partial-mold 4 comprises top frame partial-mold 14 and MRS bottom frame partial-mold 16. Namely, the PTSF injection mold 1 comprises the four partial-molds of the upper 2 and lower partial-molds 3, and the top frame 14 and MRS bottom frame partial-mold 16, and therefore the disassembling of the four partial-molds comprised in the PTSF injection mold 1 needs twice of disassembling processes such as horizontally and simultaneously removing process of the top frame 14 and MRS bottom frame partial-molds 16 in the opposite directions against each other and vertically lifting-up process of the upper partial-mold 2 without moving the lower partial-mold 3. The assembling process of the four partial-molds to build the PTSF injection mold 1 is accomplished by building the cavity partial-mold 4 on the lower partial-mold 3 on the workbench of the injection machine by combining the top frame 14 and MRS bottom frame partial-molds 16 which are horizontally and simultaneously brought back in the opposite directions against each other, and then the upper partial-mold 2 vertically lays down on the cavity partial-mold 4. Such a three dimensional assembling and disassembling processes of the PTSF injection mold 1 can be handled without any problems under the mechanical operation of a vertical injection molding machine which is employed for fabrication of the PTSF 1.

By assembling the four partial-molds to build the PTSF injection mold 1, the PTSF cavity 28-1 is formed surrounding the cavity partial-mold 4 (built by combining the top frame 14 and MRS bottom frame partial-molds 16) in the core of the PTSF injection mold 1. When the upper 2 and lower partial-molds 3 are brought together in contiguous relation to cover the upper and lower halves of the cavity partial-mold 4, the upper and lower PTSF cavity halves 43 hollowed-out on the inner surfaces of the upper 3 and lower partial-molds 4 join together to define the PTSF cavity 28-1 surrounding the MRSF 29 of the cavity partial-mold 4, shown in FIGS. 1-1 and 1-2, previously built over the parting line 12 of the PTSF injection mold 1 shown in FIG. 1. The PTSF cavity 28-1 formed surrounding the MRSF 29 in the core of the PTSF injection mold 1 is in the same configuration of the PTSF 29 shown in FIG. 2.

Based on the disassembling and reassembling of the PTSF injection mold 1 described above, the ejection of the molded PTSF 29 from the PTSF injection mold 1 is described by using an automatic ejection operation of the vertical injection molding machine, which starts from the setting of the PTSF injection mold 1 on the workbench of the vertical injection molding machine as follows.

Firstly, a setting up of the PTSF injection mold 1 on the workbench of the vertical injection molding machine starts by placing the lower partial-mold 3 with its inner surface facing up over the workbench of the injection molding machine, pointing its top frame 49-1 and bottom frame sides 46-1 to be respectively in accord with the left and right sides of the workbench;

Secondly, each of the top frame partial-mold 14 and the MRS bottom frame partial-mold 16 is horizontally moving inward to the center of the workbench from the left and right outside of the workbench in opposite directions against each other to be respectively in accord with the left and right sides of the workbench and being combined by attaching each of the plugged tube end producers 55 on the top frame partial-mold 14 on every plugged ends of the metal tubes 42 of the MRS bottom frame partial-mold 16 to create the cavity partial-mold 4;

Thirdly, the cavity partial-mold 4 is placed 4 over the lower partial mold 3 previously placed over the workbench, whose top frame 49-1 and bottom frame sides 46-1 are respectively in accord with the left and right side of the workbench, to create the lower PTSF cavity 28-1 half between the lower partial-mold 3 and the cavity partial-mold 4 by joining the hollowed-out inner surface of the lower partial-mold 3 and the lower MRSF half of the cavity partial-mold 4 together in contiguous relation;

Fourthly, the upper partial-mold 2 with its inner surface facing down is placed over the lower partial-mold 3 with the upper MRSF half of the cavity partial-mold 4 protrudent on the inner surface of the lower partial-mold 3. Then, the PTSF cavity halves 43 hollowed-out on the inner surfaces of the upper 2 and lower partial-molds 3 and the MRSF 29 of the cavity partial-mold 4 cooperate to form the PTSF cavity 28-1 surrounding the MRSF 29 of the cavity partial-mold 4 in the core of the PTSF injection mold 1. The formed PTSF cavity 28-1 includes the top 15 and bottom frame cavities 17 and a plurality of tube cavities 25 between the top 15 and bottom frame cavities 17. The formed PTSF cavity 28-1 in the core of the PTSF injection mold 1 is in the same configuration with the PTSF 29 shown in FIG. 2.

Finally, disassembling of the PTSF injection mold 1 on the workbench of the vertical injection molding machine to release the molded PTSF 29 out of the PTSF injection mold 1 starts by removing the cavity partial-mold 4 from the PTSF injection mold 1. The cavity partial-mold 4 is removed by horizontally pulling the top frame partial-mold 14 and the MRS bottom frame partial-mold 16 at the same time out of the PTSF injection mold 1 in the opposite directions against each other. Such a removing of the cavity partial-mold 4 is accomplished by horizontally pulling the metal-rod-filled-tubes 23 out of the molded tubes of the PTSF cavity 28-1 along with the MRS bottom frame partial-mold 16 at the same time and leaves the molded PTSF 29 alone in the core of the PTSF injection mold 1. And next, by lifting up the upper partial-mold 2 from the PTSF injection mold 1, the product PTSF 29 is left alone over the lower partial-mold 3 and pushed off from the lower partial-mold 3 by ejecting operation of the ejector pin plate 83 and ejector associate pins 77 of the ejector system assembly 82 attached beneath the PTSF injection mold 1 shown in FIG. 1.

Upper and Lower Partial-Molds

As the inner surfaces of the upper 2 and lower partial-molds 3 are in the same configurations of the components necessary to form the PTSF cavity 28-1 within the PTSF injection mold 1 as shown in FIGS. 3-2 and 3-3, the same configured upper and lower partial-molds are fabricated as shown in FIGS. 4-1 to 4-6. FIG. 4-1 shows the schematic picture of the inner surface of the partial-mold, used for the upper 2 and lower partial-molds 3, which comprises a plurality of long rectangular gray-parts 43-1 with slanted lines 44 showing the hollowed-out MRS cavity half 43 of the PTSF cavity 28-1, long narrow square dot lines 49, 46 attached on the top and bottom sides of the hollowed-out MRS cavity half 43 showing the imaginary frames 49, 46 of the top and bottom frame halves of the PTSF cavity 28-1, and also FIG. 4-1 shows multiple female 45 and male 48 push-button producers made respectively near the left and right end-sides of the both imaginary frames 49, 46 and hollowed-out male push-button producer halves 48-1 made on the right ends of the long square dot lines 49, 46. FIGS. 4-3 and 4-4 show respectively the side views of the cross sections of line VI-VI and VII-VII of the top frame 49 and bottom frame halves 46 of the PTSF cavity 28-1 shown in FIG. 4-1. The top frame 51 and bottom frame white square boxes 52 shown in FIGS. 4-3 and 4-4 are filled with each of the top and bottom frame halves 49, 46 of the PTSF cavity 28-1 when the upper and lower side halves of the cavity partial-mold 4 shown in FIG. 3-1 are covered with the upper 2 and lower partial-mold 3 shown in FIGS. 4-1, 3-2, and 3-3. FIG. 4-2 illustrates the V-V cross section view of the hollowed-out PTSF cavity halves 43 on the inner surfaces of the upper 2 and lower partial-molds 3. The dark 53 and gray parts 20 shown in FIG. 4-2 are the hollowed-out PTSF cavity mold half and mold base plate, respectively, and the half-circle-carved white parts are hollowed-out MRS cavity halves 43 with carved corrugated spiral line producers 44. FIGS. 4-3 and 4-4 respectively show the female 45 and male push-button producers 48, 48-1 making the male 34 and female push-buttons 39 on the both sides of top 30 and bottom frames 31 of the PTSF 29 shown in FIG. 2, and also they show the male push-button producers 48-1 making male push-buttons on the right end-surfaces of the top and bottom frames. FIGS. 4-5 and 4-6 respectively show the lowest height (lower surface of tube cavity half) and highest height (inner surface line of the lower partial-mold) of the mold cross sections along the axis of the hollowed-out tube cavity half taken along the lines VIII-VIII and IX-IX shown in FIG. 4-1. The slanted lines 44 shown in FIG. 4-1 are in the same configurations on the inner surfaces of the upper 2 and lower partial-mold 3 as shown in FIGS. 3-2 and 3-3. The slanted lines 44 are the carved corrugated spiral lines 44 on the surfaces of the hollowed-out tube cavity half 43-1 to produce protrudent spiral lines 44 on the surface of the corrugate tubes 37. The slanted directions of the carved corrugated spiral lines 44 on the inner surfaces of the upper 2 and lower partial-molds 3 are in same directions as shown in FIGS. 3-2, 3-3, and 4-1. Such carved corrugated spiral lines 44 are arranged to form continuously-linked corrugated spiral line cavities 44-1 over the tube cavity 25 formed surrounding the metal-rod-filled-tube 23 of the cavity partial-mold 4 as shown in FIGS. 4-7 and 4-8 when the upper 2 and lower partial-molds 3 are brought together.

FIGS. 4-7 and 4-8 show schematic configuration pictures of assembled upper and lower partial-molds obtained by combining each of the molds shown in FIGS. 4-5 and 4-6 and their upside-down molds. FIG. 4-8 is obtained by touching each other of the inner surfaces 47-1 of the lower partial-mold 3 shown in FIG. 4-5 and its upside-down mold at the parting line 12 such as the inner surfaces of the upper 2 and lower partial-molds 3 are contacted at the parting line 12 of the PTSF injection mold 1. FIG. 4-7 is also obtained by assembling together the mold shown in FIG. 4-5 and its upside down mold by adjusting the figure height shown in FIG. 4-7 to be same with the height of the figure shown in FIG. 4-8. The dot lines shown in FIG. 4-7 are the imaginary mold (upper partial-mold) combined with the true mold (lower partial-mold) shown in FIG. 4-5 and the imaginary tube cavity 25 created between the imaginary upper partial-mold 2 and true lower partial-mold 3, which shows how to explicitly use the simple true mold (lower partial-mold) shown in FIGS. 4-5 and 4-6 in the PTSF injection mold 1.

The hollowed-out tube cavity halves 43-1 are arranged on the inner surfaces 47-1 of the upper 2 and lower partial-molds 3 by placing the hollowed-out tube cavity half 43-1 on the left end-side of the PTSF cavity 28-1 half to be apart from left edges of the imaginary top 49 and bottom frames 46 shown in FIG. 4-1 by ¾ tube-regular-spacing (an interval between the longitudinal center lines (axes) of the adjacent tubes provided along the axis of the frame of PTSF), while that on the right end-side of the PTSF cavity 28-1 half by ¼ tube-regular-spacing from the right edges of the imaginary top 49 and bottom frames 46. Such an arrangement of the tubes 37 of the fabricated PTSF 29 allows the tubes 37 packed in the PTSF pack to be arranged in a zigzag configuration, when the PTSFs 29 are assembled to fabricate the PTSF pack by assembling side by side of the PTSFs 29 by horizontally rotating of every other PTSF 29 by 180 degree. To assemble the PTSFs 29 for fabrication of the PTSF pack by following the assembling procedure described above, multiple male push-button producers 48 are made on the both end sides of the imaginary top 49 and bottom frames 46 by an equal space between adjacent male push-button producers 48 along the axes of the imaginary frames 15, 17 at the same distances from both edges of the imaginary frames 15, 17 as shown in FIG. 4-1, and also a same number of female push-button producers 45 are made on the other both end sides of the imaginary frames 46, 49 in the same way as done for the opposite end sides. In case of joining of the PTSF packs side by side, the push-buttons 34, 39 on the end-sides or end-surfaces of the top 30 and bottom frames 31 of the outermost PTSF 29 of the PTSF pack are joined with the counterpart push-buttons 39, 34 of the PTSF pack to be attached and the piling of one pack on the other pack is achieved by aligning and inserting of the female push-buttons 39 on the bottom of the upper pack to be piled into the counterpart male push-buttons 34 on the top of the pack. Since the PTSF cavity halves 43 hollowed-out inner surfaces of the upper 2 and lower partial-molds 3 are same in their configuration and positions, one of the upper 2 and lower partial molds 3 is fabricated and used for the both partial-molds.

When both upper and lower surface halves of the cavity partial-mold 4 within the PTSF injection mold 1 positioned as shown in FIG. 1 are covered with the upper 2 and lower partial-molds 3, the upper and lower MRSF 29 halves of the cavity partial-mold 4 are covered with each of the inner surfaces 47-1 of the upper 2 and lower partial-molds 3, containing the imaginary top 49 and bottom frame lines 46 and a plurality of hollowed-out tube cavity halves 43-1, to create the PTSF cavity 28-1 formed surrounding the surface of the MRSF 29 within the cavity partial-mold 4. Thus, the molten plastics is injected into the PTSF cavity 28-1 through the injection molding machine and the PTSF is formed surrounding the PTSF cavity. After cooling and setting of the molten PTSF 29, the molded PTSF 29 is ejected from the PTSF injection mold 1. The both left end-sides of the top 30 and bottom frames 31 of the fabricated PTSF 29 have multiple male push-buttons 34, which are placed at the same distances from the both edges of the frame and arranged by an equal space between adjacent push-buttons along the axis of the frame. The other both end-sides of the top 30 and bottom frames 31 have the same number of female push-buttons 39 arranged in the same configuration as arranged on the opposite sides of the frames as shown in FIGS. 2, 2-1, and 2-2. Such arrangements of the male 34 and female push-buttons 39 on both end-sides along the axes of the top 30 and bottom frames 31 allow the PTSFs 29 to be assembled by aligning and pressing the male 34 and female push-buttons 39 on the previous PTSF 29 over their counterpart female 39 and male 34 push-buttons on the present PTSF 29 horizontally rotated by 180 degree as described above.

Cavity Partial-Mold

The schematic picture of the cavity partial-mold 4 is shown in FIGS. 1-1 and 3-1. FIG. 1-1 shows the cavity partial-mold 4 placing in the core and on the cross section I-I of the PTSF injection mold shown in FIG. 1. FIG. 3-1 illustrates the schematic drawing of the cavity partial-mold 4 comprising the top frame 14 and MRS bottom frame partial-molds 16 which is made up of by joining the top frame partial-mold 14 shown in FIGS. 5-2 and 5-4 and MRS bottom frame partial-mold 16 shown in FIGS. 5-1 and 5-3. FIGS. 5-1 to 5-6 explicitly show the schematic pictures of two components of the top frame 14 and MRS bottom frame partial-molds 16 separated from the cavity partial-mold 4. FIGS. 5-2, 5-4, and 5-5 show the schematic pictures of the front, side, and inner surface views of the top frame partial-mold 14, respectively. FIGS. 5-1, 5-3, and 5-6 illustrate the pictures of the MRS bottom frame partial-mold 16 showing the front, side, and top views of the MRS 22 attached on the inner surface along the axis of the bottom frame, respectively. As shown in FIGS. 5-5 and 5-6, the top view of the MRS bottom flame partial-mold 16 is in a same shape with that of the inner surface of the top frame partial-mold 14 except for dark circles 56 with black dots 21 showing water-inlet-ends of U-shaped cooling loop embedded metal-rod-filled-tubes 24 of MRS 22 and white spots 48 on the both end-side bottom frame base plate 18 of the top frame partial-mold 14. The counterparts of the dark circles 56 are the gray circles 55 on the inner surface of the top fame partial-mold 18 which are the plugged ends 42 of the tubes 24 of the MRS 22, making the plugged tube ends 32 shown on the top frame 30 of the PTSF 29 shown in FIG. 2. The counterparts of the white spots 48 are the black spots 45 on both end-side bottom frame base plate 19 of the bottom frame partial-mold 16 which are the hollowed-out male push-button producers making the male push-buttons 34 on the left- and right-side top surfaces of the top frame 30 of the PTSF 29 as shown in FIG. 2. The black spots 45 made on the left end-surfaces of the top and bottom frames of the top 14 and MRS bottom frame partial molds 16 are female push-button producers making female push-buttons 39 on the left end-surfaces of the top and bottom frames of the PTSF 29 shown in FIGS. 2-1 and 2-2. As shown in FIGS. 5-1 and 5-2, the top 15 and bottom frame imaginary lines 17 produce the top 30 and bottom frames 31 of the PTSF 2 shown in FIG. 2 and their top views are schematically drawn as shown in FIGS. 5-5 and 5-6 comprising a plenty of partial circular dark plate hole producers 41 and tube holders 54 surrounding the white circle tube producers 25 formed surrounding the metal tubes 23 with the plugged tube end producers 55 inside the white circles 25 provided along the axis of the frame. FIGS. 5-2 and 5-4 show a plurality of groups of protrudent dark plate hole producers 41 attached along the axis of the top frame imaginary line 15. The protrudent dark plate hole producers 41 shown in FIG. 5-2 are side views of the partial circular dark plate hole producers 41 attached on the top frame base plate 18 of the top frame partial-mold 14 shown in FIG. 5-2. FIG. 5-4 shows the left side view of the top frame partial-mold 14. The dark protrudent plate hole producers 41 make the partial circular holes 33 on the top 30 and bottom dark frames 31 of the PTSF 29 shown in FIG. 2. The white parts 54 in the top and bottom frame imaginary line 15 shown in FIGS. 5-1 and 5-2 make the tube holders 35 and frame bodies of the top and bottom dark frames 30, 31 of the PTSF 29 shown in FIG. 2. Likewise, when the molten plastics is injected into the top 15 and bottom frame imaginary lines 17, top and bottom frame cavity, of the cavity partial mold 4 shown in FIG. 3-1, each of the dark 41 and white parts 54 in the top 15 and bottom frame imaginary lines 17 makes the partial circular holes 33 and the top 30 and bottom frame bodies 31, including the plugged tube ends 32 and tube holders 35, of the PTSF 29 shown in FIG. 2.

Since the cavity partial mold 4 comprises two structured components of the top frame 14 and MRS bottom frame partial molds 16 as described in the second paragraph of Summary of the Invention, the cavity partial mold 4 can be separated into the top frame 14 and MRS bottom frame partial molds 16 by pulling out the top frame partial mold 14 and the MRS bottom frame partial mold 16 horizontally against each other from the cavity partial-mold 4. When the molten plastics is injected into the PTSF injection mold 1 to fabricate the PTSF 29, the molten plastics fills the PTSF cavity 28-1 comprising the top frame 15 and MRS bottom frame cavities 17-1 respectively formed surrounding the imaginary top frame 15 and MRS 22 attached on the imaginary bottom frame 17 of the MRS bottom frame 16-1. After cooling and setting of the molten plastic PTSF formed within the PTSF cavity 28-1 surrounding the cavity partial-mold, the top frame partial-mold 14 and the MRS bottom frame partial-mold 16 are removed out of the formed PTSF 29. The removing of the top frame partial-mold 14 is to remove the partial circular plate hole producers 41, hollowed-out male push-button producers 48, and female push-button producers 45 out of the formed plastic top frame 30 and the removing of the MRS bottom frame partial-mold 16 to remove the MRS 22, partial circular plate hole producers 41, and female push-button producers 45 out of the formed plastic-tube-screen 29 and formed plastic bottom frame 31 of the formed PTSF 29. Such removal processes of the top frame 15 and MRS bottom frame 16-1 are achieved by pulling out the top frame partial mold and the MRS bottom frame partial-mold horizontally against each other.

Runner System for Supplying of Molten Plastics into PTSF Cavity

The PTSF 29 is in a complex structure comprising the plastic-tube-screen 29-1 made with a plurality of corrugate tubes 37 as shown in FIG. 2 and the formed PTSF cavity 28-1 within the PTSF injection mold 1 has a large volume necessary to be filled with a large amount of molten plastics, so that a plurality of gates 67 are necessary to manage the large amount of molten plastics to pass all gates 67 to fully fill the PTSF cavity 28-1 at the same time and within as short time as possible before the molten plastics loses its required viscosity. To achieve this end, the layout of the bridge runners and gate locations is designed for the runners and gates to be symmetrically and equidistantly placed surrounding the longitudinal center line of the PTSF for the molten plastics to fill the cavities in uniform velocity.

Two gates 67 are made on each of upper tube cavity halves 53 of the PTSF cavity 28-1 half hollowed-out on the inner surface 47-1 of the upper partial mold 2. Their locations on the hollowed-out tube cavity half 43-1 are respectively made at the same distance from the both ends of the hollowed-out tube cavity half 43-1. For supplying of the molten plastics uniformly to all gates 67, an H-type bridge runner system 59 is known to be suitable. Hence, the H-type bridge runner system 59 is employed as shown in FIGS. 6-1 and 6-2. The H-type runner system 59 supplying of the molten plastics to all gates 67 needs a long runner 62 and also the molten plastics should be kept in a required molten state while flowing through the long runner 62. To achieve this, the temperature surrounding the runners 62 should be kept in an equal or higher temperature than required temperature. If not, the required rapid and steady flowing of the molten plastics through the runners 62 is disturbed to stop the processing of molding, due to degrading the viscosity of the molten plastics into a low viscosity. To keep the temperature of the molten plastics flowing through the runners 62 in the required operational conditions of the molten plastics, the runners 62 are maintained under the same or higher temperature by heating the runners with a heated manifold 63 provided surrounding the runners 62, so-called, hot runner system 58 embedding the runners 62 as shown in FIGS. 6-1 and 6-2. Consequently, the heat of the hot runner system 58 is controlled by the heated manifold 63 and then the heat of the H-type runners 59 is consecutively controlled to keep the rapid and steady flowing of the molten plastics through the runners 62. To conserve the heat inside the upper partial-mold 2, the outside surface of the upper partial-mold 2 is covered with an insulator to prevent a loss of heating through the wall.

The hot runner system comprises sprue 61, main hot runners 64, bridge hot runners 65, nozzles 66, and gates 67 as shown in FIGS. 6-1 and 6-2. To permit a rapid and steady flowing of the molten plastics through the runners 62 to reach the gate areas 67, the cross-sectional area of the sprue 61 is provided as large enough as passing the large amount of molten plastics to fill all the PTSF cavity 28-1 within a required time and the cross-sectional area of the main hot runner 64 is a little smaller than that of the sprue 61, and also the cross-sectional areas of the bridge hot runners 65 are smaller than the main hot runner 64 cross-sectional area. Additionally, all runner intersections have cold-slug-wells 65-1 to help the smooth steady flow of the molten plastics through the runners 62 as shown in FIGS. 6-1 and 6-2. The nozzles 66 attached on the ends of the bridge hot runners 65 have the same cross-sectional area with those of the bridge hot runners 65 in order to keep the same flowing rates of the molten plastics through the runners 62 for compensating a drawback of a large amount of molten plastics required due to a plurality of long tube cavities 25. The gates 67 attached on the nozzles 66 are made with relatively wide cross-sectional areas, compared with conventional narrow gate area, since it is necessary for the long PTSF cavity 28-1 to be quickly filled with molten plastics to prevent a slowly filling of the cavities due to a low viscosity of the molten plastics.

Setting of Gas Venting Lines

Figure 31:
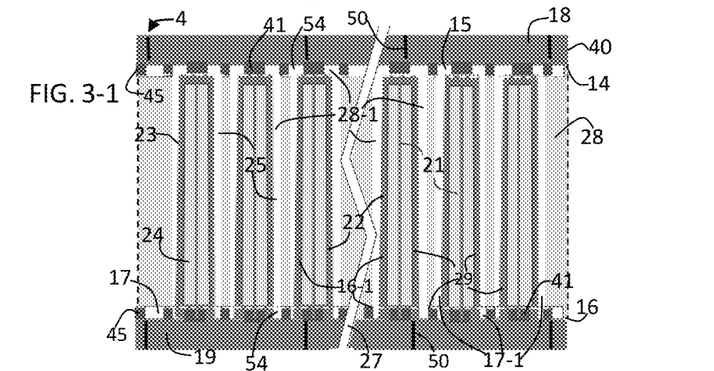
Figure 32:
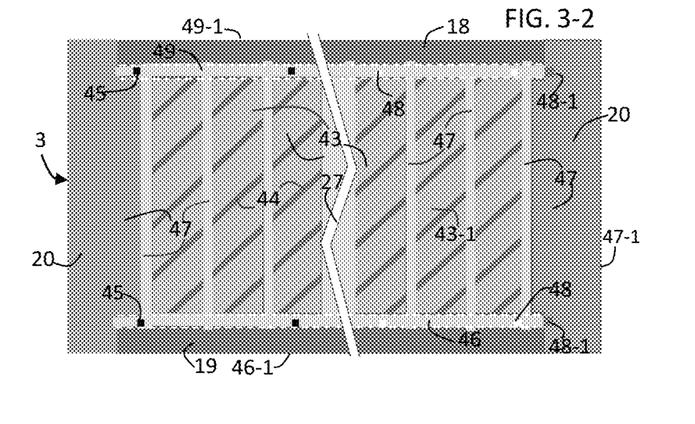
Figure 33:
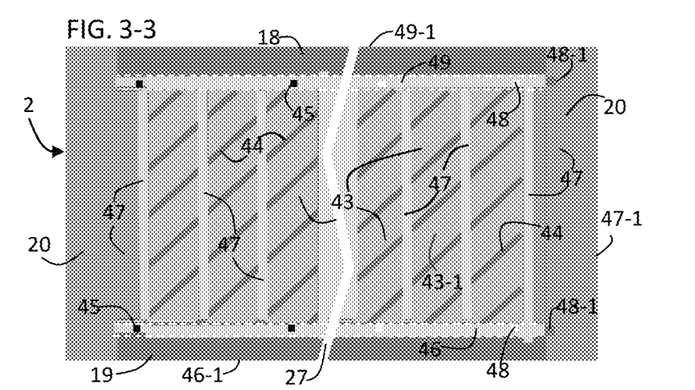

By assembling of the upper 2 and lower partial-molds 3 and the cavity partial-mold 4, the PTSF cavity 28-1 is formed surrounding the cavity partial-mold 4 in the core of the PTSF injection mold 1. The PTSF cavity 28-1 is full of air or gas. Hence, if the molten plastics is injected into the PTSF cavity 28-1 to fabricate the PTSF 29, then the gas vents out of the mold through the gap of the parting line 12 between the jointed inner surfaces 47-1 of the upper 2 and lower partial-molds 3 and ejector pin gaps 77 provided in the base plates 20 of the lower partial-mold 3 as shown in FIGS. 6-1 and 6-2 when other gas venting channels 50 are not provided. But those gaps are not enough to unresistingly and quickly vent a large amount of gas out of the PTSF cavity 28-1 within a short time. If the gas slowly vent out, the molten plastics cannot quickly fill all cavities owing to a back pressure of the gas developed by pressing the gas remaining in the cavity 28-1 due to flowing pressure of the molten plastics. To eliminate such problems of the gap-venting of gas, multiple gas venting channels 50 are made on the upper surfaces of top 18 and bottom frame base plates 19 of the cavity partial mold 4 by connecting one end of the gas venting lines 50 to the top 15 and bottom frame producers 17 as shown in FIG. 3-1.

Cooling Process of Molded PTSF

The cooling system 106 embedded within the PTSF injection mold 1 of the present invention is designed to intensively and effectively cool the molded PTSF 29 formed in the PTSF cavity 28-1 surrounding the cavity partial-mold 4 in the core of the PTSF injection mold 1 as shown in FIGS. 6-1, 6-2, and 7. As shown in FIG. 7, the cooling system 106 provided within the cavity partial-mold 4 comprises four groups of U-shape cooling loops 21 built in the metal solid rods 24 of the MRS 22 within the cavity partial-mold 4 and a single U-shape cooling loop 21 in the top frame base plate 18 of the top frame partial-mold 14 to cool the molded top frame 30 of the molded PTSF 29. The first 87 and fourth groups 90 of U-shape cooling loops 21 shown in FIG. 7 are grouped by connecting six of U-shape cooling loops 21 and the second 88 and third groups 89 by connecting five of U-shape cooling loops 21. The connection of each of the U-shape cooling loops 21 with other U-shape cooling loops 21 is accomplished by connecting the inlet 102 and outlet ports 103 of the current U-shape cooling loop 21 to the outlet port 103 of the previous one and to the inlet port 102 of the next cooling loop, respectively, as shown in FIG. 7. The inlet port 102 of the first U-shape cooling loop 21 and the outlet port 103 of the last U-shape cooling loop 21 within each group are connected respectively to the inlet outside coolant loop 100 and the zigzag-returning outlet outside coolant loop 101, which are provided in the bottom frame base plate 19 and adjacent to the outside surface of the bottom frame cavity 17 of the cavity partial-mold 4 to cool the molded bottom frame 31 as shown in FIGS. 6-2 and 7. Such patterns of connecting the U-shape cooling loops 21 are continued to the fourth group cooling loop 90. To cool the molded top frame 30 of the molded PTSF, the single U-shape cooling loop 98 is placed adjacently along the outside surface of the top frame cavity 15 and in the top frame base plate 18 of the cavity partial-mold 4 as shown in FIGS. 6-1 and 7. The inlet 100 and outlet outside coolant loops 101 connected to each group of U-shape cooling loops 21 are connected to the water-supply-and-collection-manifold 107 and those of the single U-shape cooling loop 21 cooling the molded top frame 30 are directly connected to the water-supply-and-collection-manifold 107 as shown in FIG. 7.

Figure 81:
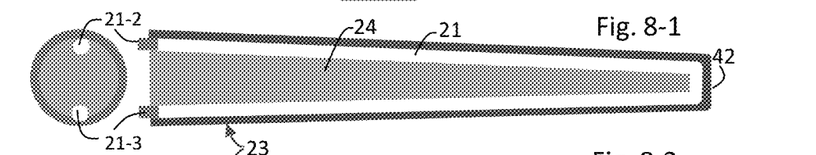
Figure 82:
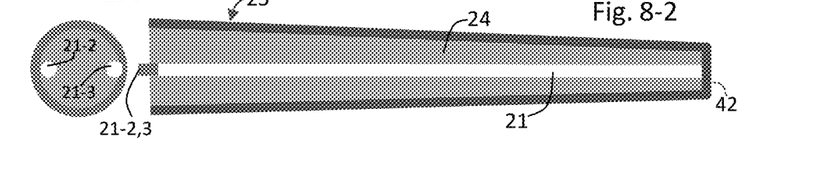

In order to build the U-shape-cooling loops 21 in the cone-shape metal rods 24 of the MRS 22 within the cavity partial-mold 4, the cone shape metal rods 24 whose large end-side-diameters are slightly smaller than the internal diameters of the plastic tubes 29-1 of the plastic-tube-screen-fill are selected and then U-shape hollowed-out lines 21-1 are made on their surfaces along the axes of the rods 24 as shown in FIGS. 8-1 and 8-2. The metal rods 24 with the U-shape hollowed-out lines 21 on their surfaces are inserted into the internal spaces of the metal tubes 23 by pushing up to the ends of the metal tubes 23 as shown in FIGS. 8-1 and 8-2. FIG. 8-1 shows a schematic drawing of an axial cross section view of a metal tube 23 filled with metal rod 24 hollowed-out of U-shape cooling loop 21 embedded over the rod surface along the axis of rod 24 and a larger end-side view of the metal tube 23 and the picture shown in FIG. 8-2 shows the cross section and larger end-side views taken after rotating the metal tube 23 by 90 degree along the axis of the metal tube 23. The U-shape cooling loops 21 are formed between the both side internal surfaces of the metal tubes 23 and the surfaces of the metal rods 24 filled in the metal tubes 23 due to tightly joining the internal surfaces of the metal tubes 23 and the U-shape hollowed-out line 21-1 surfaces of the metal rods 24. Thus, the metal-rod-filled-tubes 23 of the MRS 22 of the cavity partial-mold 4 include the U-shape cooling loops 21 touched the internal surfaces of the metal tubes 23. Namely, U-shape-cooling-loop embedded Metal-Rod-filled-tube-Screen (UMRS) 22-1 are developed, which has a dual-function of molding the plastic tubes 29-1 surrounding their surfaces and cooling them by circulating coolant through the U-shape cooling loops 21. When the molded tubes 25-1 surrounding the UMRS 22-1 of the cavity partial-mold 4 in the PTSF injection mold 1 is cooled by circulating coolant through the U-shape cooling loops 21, the heat absorbed in the molded tubes 25-1 formed surrounding the surfaces of the UMRS 22-1 is transferred into the coolant in the U-shaped cooing loops 21 in the UMRS 22-1 through the thin wall of the metal tubes 23 by thermal conduction mechanism, and then the heated coolant is carried away from the molded tubes 25-1 by circulating coolant through the U-shape cooling loops 21 embedded within the metal-rod-filled-tubes 23 of the UMRS 22-1. The inlet 69 and outlet ports 72 are provided by attaching ports 21-2, 21-3 to both ends of the hollowed-out U-shape cooling loops 21 made between the internal surface of the metal tube 23 and the surface of the metal rods 24 as shown in FIGS. 8-1 and 8-2.

Ejecting Process of Molded PTSF from PTSF Injection Mold

The PTSF injection mold 1 is mounted on the horizontal workbench of the vertical injection molding machine and the molten plastics is injected into the PTSF cavity 28-1 in the core of the PTSF injection mold 1 through the injection machine to form the PTSF 29 within the cavity partial-mold 4. The formed plastic PTSF 29 is cooled by coolant circulating surrounding the PTSF cavity 28-1. When the molded PTSF 29 is properly cooled to be ejected, the ejection process of the molded PTSF 29 starts by removing the cavity partial-mold 4 in the core of the PTSF injection mold 1. The cavity partial-mold 4 is removed simultaneously and horizontally pulling the top frame 14 and MRS bottom frame partial-molds 16 out of the PTSF injection mold 1 in the opposite directions against each other. At the same time, the metal-rod-filled-tubes (MRS) 22 within the molded plastic tubes 29-1 of the molded PTSF 29 are pulled out along with the MRS bottom frame partial-mold 16 because the MRS 22 is attached on the bottom frame 31 being in the single structure. Hence, the molded PTSF 29 remains alone in the core between the upper 2 and lower partial-molds 3 without the cavity partial mold 4. Next, the upper partial-mold 2 is lifted-up and removed away to leave the molded PTSF 29 on the lower partial-mold 3. Finally, the ejector pin plate 83 and ejector associate pins 77 are moved upward to push the molded PTSF 29 off from the lower partial-mold 3 under operation of the mold ejector controller of the ejector system assembly 82 shown in FIG. 1. To fabricate the next PTSF 29, the PTSF injection mold 1 is set up on the workbench of the injection molding machine. The setting of the PTSF injection mold 1 is accomplished by following the reverse unloading procedure of the top frame 14 and MRS bottom frame 16, and upper partial-molds 2. Namely, the top frame 14 and MRS bottom frame partial-molds 16 are simultaneously placed back over the lower partial-mold 3 on the workbench, and then the upper partial-mold 2 is placed over the top frame 14 and MRS bottom frame partial-molds 16. Such loading and unloading of the all partial-molds are achieved by an automatic mechanical operation.

The PTSF injection mold 1 of the present invention fabricates PTSFs 29, being able to replace PVC-film-fills using in water evaporative cooling towers, which have a higher water cooling efficiency compared with that of the PVC-film-fills, so that the PTSFs 29 reduce the operation and construction expenses of the cooling tower and the production of plastic wastes due to the utilizing of high cooling efficient media. In order to commercialize the PTSFs 29, a manufacturing tool of the PTSFs 29 fabricating a low-cost PTSF 29 to overcome the extremely complex-structured PTSF 29 is needed. To achieve this end, the PTSF injection mold 1, which can fabricate the PTSF 29 in one single shot of the molten plastics, is invented by comprising four partial-molds and operated in three dimensional disassembling and reassembling process using a vertical injection molding machine.

While only specific embodiments of the invention has been described and shown, this invention may be further modified and altered within the concept and scope of this disclosure. This application is therefore intended to cover any modifications, alterations, variations, adaptations, or use of the invention using its general principles. Further, it is intended to include all such modifications and alterations insofar as they come within the scope of the appended claims or the equivalent thereof.

What is claimed is:

1. An injection mold for fabricating a plastic-tube-screen-fill comprises upper and lower partial-molds, top frame and metal-rod-screen-fill attached bottom frame partial-molds, plastic tube-screen-fill cavity partial-mold, hot runner system, cooling system, molded plastic-tube-screen-fill ejection process, and ejector system assembly, wherein the upper and lower partial-molds and top frame and metal-rod-attached bottom frame partial-molds are assembled at mold parting line of the injection mold between the upper and lower partial molds to create plastic tube-screen-fill cavity over the mold parting line, wherein the plastic tube-screen-fill cavity is positioned at the point where left side space between left end of frames and left side tube on top and bottom frames is shorter than right side space between right side end of frames and right side tube to make the tubes contained in a square box shape assembled plastic-tube-screen-fills arranged in line up of zigzag arrangement, wherein the upper and lower partial molds have the equally designed inner surfaces comprising hollowed out tube-screen-fill cavity halves of the plastic tube-screen-fill cavity, wherein the plastic-tube-screen-fill cavity comprises top frame and metal-rod-filled-tube attached bottom frame cavities with push-button producers provided on both end-side-surfaces of the top and bottom frame cavities, wherein the upper and lower partial-molds are brought together to create tube-screen-fill cavity surrounding the top fame and metal-rod-filled tube attached bottom frame by covering the upper and lower halves of the top frame and metal-rod-filled tube attached bottom frame cavities with the inner surface of the upper and lower partial-molds, and wherein top frame partial mold is made with a plurality of circular partial tubes attached surrounding the circular holes provided on the inner surface along the axis of the top frame of the top frame partial mold and metal-rod-filled-tube-screen-fill attached bottom frame partial mold is made with a plurality of metal-rod-filled-tubes whose larger ends are attached over every circle provided on the inner surface along the axis of the same structured frame with top frame of the top frame partial-mold.

2. The injection mold for fabricating of a plastic-tube-screen-fill of claim 1, the hollowed-out tube-screen-fill cavity halves on the inner surfaces of the tube-screen-fill cavity partial mold comprise a plenty of hollowed-out tube cavity half base plates comprising carved-out slanted corrugated spiral lines on the hollowed-out surfaces of the tube cavity halves of the hollowed-out tube-screen-fill cavity half base plates.

3. The injection mold for fabricating of a plastic-tube-screen-fill of claim 1, the hollowed-out top and bottom frame base plates of the tube-screen-fill cavity partial mold comprise the female or male push button producers on both end-surfaces of their top and bottom frame base plates.

4. The injection mold for fabricating of a plastic-tube-screen-fill of claim 1, the hot runner system is set up in the upper partial mold and maintains hot molten plastics under uniform temperature while flowing through runners from the sprue of injection molding machine to a plenty of gates.

5. The injection mold for fabricating a plastic-tube-screen-fill of claim 1, the hot runner system comprises the sprue, main hot runner, bridge hot runners, nozzles, and gates arranged in the layout of the bridge runner system covered with the heated manifold to maintain all runners and gates under hot and uniform temperature, wherein the layout of the bridge runners and gate locations is designed for the runners and gates to be symmertrically and equidistantly placed for the molten plastic to fill the cavities in uniform velocity.

6. The injection mold for fabricating of a plastic-tube-screen-fill of claim 1, the cooling system comprises molded plastic-tube cooling loop, single U-shape cooling loop, inlet outside coolant loop and zigzag-returning outlet outside coolant loop for cooling of molded plastic-tubes, top frame, and bottom frame formed within the cavity partial-mold, wherein the inlet outside coolant loop and zigzag-returning outlet outside coolant loop are provided in the bottom frame base plate adjacent to the outside surface of the bottom frame cavity of the molded plastic-tube-screen-fill.

7. The injection mold for fabricating of a plastic-tube-screen-fill of claim 6, the molded-plastic-tube cooling loop comprises a plenty of U-shape cooling loops built in the metal rods of the metal-rod-filled-tube-screen within the cavity partial-mold, wherein a plenty of the U-shape cooling loops built in the metal rods are grouped into four groups, wherein the single U-shape cooling loop is provided in the top frame base plate of the top frame partial mold adjacent along to the outside surface of the top frame partial-mold.

8. The injection mold for fabricating of a plastic-tube-screen-fill of claim 1, the molded plastic-tube-screen-fill ejection process starts by disassembling of horizontally and simultaneously removing process of the top frame and metal-rod-filled-tube-screen-fill attached bottom frame partial-molds in the opposite directions against each other to leave alone the molded plastic-tube-screen-fill within the injection mold, wherein the molded plastic-tube-screen-fill within the injection mold remains alone on the lower partial-mold due to vertically lifting up of the upper partial-mold from the lower partial-mold without moving the lower partial-mold, and wherein the molded plastic-tube-screen-fill on the lower partial-mold is pushed off from the lower partial-mold by moving upward of the ejector pins of the ejector system assembly attached on the bottom of the injection.

9. The injection mold for fabricating of a plastic-tube-screen-fill of claim 1, the ejector system assembly attached on the bottom of the lower partial-mold consists of return spring, ejector guide pin, ejector (associate) pins, ejector bar, ejector back plate, ejector pin plate, and back plate stopper.

* * * * *